United States Patent
Jung et al.

(10) Patent No.: US 9,379,387 B2
(45) Date of Patent: Jun. 28, 2016

(54) CATHODE CURRENT COLLECTOR COATED WITH PRIMER AND MAGNESIUM SECONDARY BATTERY COMPRISING THE SAME

(71) Applicant: LG CHEM, LTD., Seoul (KR)

(72) Inventors: YoungHwa Jung, Daejeon (KR); Young Sun Choi, Daejeon (KR); Yong Tae Lee, Jeonju-si (KR); Seung-tae Hong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 13/752,739

(22) Filed: Jan. 29, 2013

(65) Prior Publication Data

US 2013/0143126 A1 Jun. 6, 2013

Related U.S. Application Data

(63) Continuation of application No. PCT/KR2011/005681, filed on Aug. 2, 2011.

(30) Foreign Application Priority Data

Aug. 9, 2010 (KR) .................... 10-2010-0076204

(51) Int. Cl.
*H01M 4/66* (2006.01)
*H01B 1/12* (2006.01)
*H01M 4/58* (2010.01)
*H01M 10/054* (2010.01)
*H01M 4/136* (2010.01)

(52) U.S. Cl.
CPC ............... *H01M 4/667* (2013.01); *H01B 1/122* (2013.01); *H01M 4/136* (2013.01); *H01M 4/5815* (2013.01); *H01M 4/662* (2013.01); *H01M 4/668* (2013.01); *H01M 10/054* (2013.01); *Y02E 60/122* (2013.01)

(58) Field of Classification Search
None
See application file for complete search history.

(56) References Cited

U.S. PATENT DOCUMENTS 5,447,809 A * 9/1995 Hafner et al. ................. 429/165
5,478,676 A 12/1995 Turi et al.
5,578,396 A * 11/1996 Fauteux et al. .............. 429/209

(Continued)

FOREIGN PATENT DOCUMENTS

CN 1411083 A 4/2003
JP 07-302586 11/1995

(Continued)

OTHER PUBLICATIONS

International Search Report issued in PCT/KR2011/005681, mailed on Mar. 12, 2012.

(Continued)

*Primary Examiner* — Patrick Ryan
*Assistant Examiner* — Haixia Zhang
(74) *Attorney, Agent, or Firm* — Birch, Stewart, Kolasch & Birch, LLP (57) ABSTRACT

Disclosed is a current collector prepared by coating a primer on a metallic base and a magnesium secondary battery including the same. The primer includes a conductive material and a polymer material and enhances adhesive strength between a cathode current collector and an active material, thereby maintaining stability in an operating voltage range of the battery without increasing internal resistance.

12 Claims, 5 Drawing Sheets

(56) References Cited

U.S. PATENT DOCUMENTS

| | | |
|---|---|---|
| 6,544,688 B1 | 4/2003 | Cheng |
| 2001/0049060 A1 | 12/2001 | Aurbach et al. |
| 2006/0003229 A1 | 1/2006 | Sai-Cheong et al. |
| 2007/0059587 A1* | 3/2007 | Kishi et al. ............ 429/62 |
| 2007/0059604 A1 | 3/2007 | Kim et al. |
| 2008/0182176 A1* | 7/2008 | Aurbach et al. ......... 429/337 |
| 2008/0187824 A1* | 8/2008 | Tomantschger ......... 429/122 |
| 2010/0136438 A1* | 6/2010 | Nakayama et al. ....... 429/339 |

FOREIGN PATENT DOCUMENTS

| | | |
|---|---|---|
| JP | 08-329928 | 12/1996 |
| JP | 11-007394 | 1/1999 |
| JP | 11-185733 A | 7/1999 |
| JP | 2002-245994 | 8/2002 |
| JP | 2003-100347 | 4/2003 |
| JP | 2003-512704 | 4/2003 |
| JP | 2003-229126 | 8/2003 |
| JP | 2004-259650 A | 9/2004 |
| JP | 2007-157416 A | 6/2007 |
| JP | 2007-280627 A | 10/2007 |
| JP | 2009-295474 | 12/2009 |
| KR | 10-2004-0006005 A | 1/2004 |
| WO | WO 2009/147989 A1 | 12/2009 |

OTHER PUBLICATIONS

Aurbach et al., "Progress in Rechargeable Magnesium Battery Technology", Advanced Materials 2007, vol. 19, pp. 4260-4267.

Levi et al., "Kinetic and Thermodynamic Studies of Mg2+ and Li+ Ion Insertion into the Mo6S8 Chevrel Phase", Journal of Electrochemical Society, vol. 151, No. 7, (2004) pp. A1044-A1051.

* cited by examiner

CATHODE CURRENT COLLECTOR COATED WITH PRIMER AND MAGNESIUM SECONDARY BATTERY COMPRISING THE SAME

CROSS REFERENCE TO RELATED APPLICATIONS

This application is a Continuation of PCT International Application No. PCT/KR2011/005681 filed on Aug. 2, 2011, which claims priority under 35 U.S.C. §119(a) to Patent Application No. 10-2010-0076204 filed in the Republic of Korea on Aug. 9, 2010, all of which are hereby expressly incorporated by reference into the present application.

TECHNICAL FIELD

The present invention relates to a cathode current collector coated with a primer and a magnesium secondary battery including the same, and more particularly, to a cathode current collector capable of improving performance of a battery by inhibiting delamination of a cathode active material from a cathode current collect at an operating voltage of a magnesium secondary battery of 0.3 to 1.0 V by coating the cathode current collector with a primer including a conductive material and a polymer material, and a magnesium secondary battery including the same.

BACKGROUND ART

The development of techniques associated with mobile devices and increase in demand therefor have brought about rapid increase in the demand for secondary batteries as energy sources. Among secondary batteries, much research into lithium secondary batteries with high energy density and high discharge voltage has been conducted. Lithium secondary batteries are commercially available and widely used.

Despite the outstanding performance of lithium ion batteries, a manufacturing cost per unit cell is high, there is a risk of explosion, and depletion of lithium resources is of concern. In recent years, diverse research into magnesium batteries has been performed as an alternative to lithium ion batteries.

Magnesium batteries are secondary batteries capable of magnesium ion intercalation into and deintercalation from a cathode material using magnesium metal as an anode, thereby enabling charging and discharging. Magnesium batteries theoretically have more than twice the energy density of lithium ion batteries and are less expensive and more stable in air than lithium ion batteries. Thus, magnesium secondary batteries have drawn much attention as next-generation secondary batteries. However, many difficulties have been experienced in the development of magnesium batteries including a cathode material with higher energy density than lithium ion batteries and an electrolytic solution with a wide potential range. Only a magnesium battery using $Mo_6S_8$ as a cathode material and using $Mg(AlCl_2BuEt)_2$/THF as an electrolytic solution has been reported so far.

However, such a magnesium battery needs to be considerably improved before commercial application becomes viable. For example, a cathode current collector needs to be improved. If an aluminum foil is used as a cathode current collector and a copper foil is used as an anode current collector as in lithium ion batteries, the aluminum foil may react with $Mg(AlCl_2BuEt)_2$/THF, an electrolytic solution, and the copper foil may participate in an electrochemical reaction at a voltage higher than an operating voltage of magnesium by 1.5 V or more. Owing to these problems, a cathode prepared by coating a cathode material-binder-conductive agent mixture on a current collector formed of stainless steel foil or mesh is currently used in the magnesium battery.

The stainless steel is stable in an electric potential range of the magnesium battery of 0.3 V to 1.9 V and formed as a thin foil such as aluminum foil and copper foil or a grid-shaped mesh. However, due to high surface smoothness, mechanical strength, ductility, and malleability, adhesive strength between the active material and the foil is reduced during rolling in processing of a battery.

Therefore, there is still a need to develop technology to overcome these drawbacks.

DISCLOSURE

Technical Problem

Therefore, the present invention has been made to solve the above and other technical problems that have yet to be resolved.

As a result of a variety of extensive and intensive studies and experiments to solve the problems as described above, the inventors of the present invention have discovered stainless steel coated with a primer and including a conductive material and a polymer material as a current collector of a magnesium battery and confirmed that the stainless steel coated with the primer, as a current collector of a magnesium battery, solves various problems encountered in conventional stainless foil current collectors. The present invention has been completed, based on this discovery.

Technical Solution

In accordance with one aspect of the present invention, provided is a magnesium secondary battery including a cathode including a cathode active material capable of intercalating and deintercalating magnesium ions, an anode including an anode active material capable of intercalating and deintercalating magnesium ions, a separator interposed between the cathode and the anode, and an electrolytic solution including magnesium ions. The cathode includes a current collector formed by coating a primer including a conductive material and a polymer material on a metallic base and a cathode active material coated on the current collector.

The current collector should be stable without causing adverse electrochemical changes in the fabricated battery. If the current collector is corroded, the battery may not have sufficient current collecting capabilities with repeated cycling of the battery, resulting in reduced battery lifespan.

As a metal for forming the cathode current collector in magnesium secondary batteries, metallic materials such as stainless steel are widely known in the art. However, as described above, metallic materials do not have sufficient adhesive strength with the cathode active material.

However, these problems are overcome according to the present invention by using a current collector prepared by coating a primer including a conductive material and a polymer material on a metallic base.

Any metal may be used without particular limitation as the metallic base so long as it is stable at an electric potential of the magnesium secondary battery and supplies and transmits electrons. Examples of suitable metals include stainless steel, nickel, and titanium, preferably stainless steel.

The metallic base has a thickness of about 1 µm to about 150 µm and may be formed in various forms including foils, films, sheets, nets, porous structures, foams, and the like, preferably foils.

The primer suppresses an increase of internal resistance as much as possible and increases adhesive strength of the cathode active material to the metallic base. Preferably, the weight ratio of the conductive material to the polymer material may be in the range of 1:10 to 10:1. When the content of the conductive material is too low, internal resistance increases, resulting in deteriorated operating characteristics of the battery. When the content of the polymer material is too low, desired adhesive strength cannot be obtained. Thus, the weight ratio of the conductive material to the polymer material may be selected within the range described above, preferably in the range of 3:7 to 7:3.

Examples of suitable conductive materials include at least one material selected from the group consisting of graphite, carbon black, acetylene black, Ketjen black, channel black, furnace black, lamp black, thermal black, carbon fiber, and carbon fluoride, but are not limited thereto. Preferably, the conductive material is carbon black. The conductive material may have a particle diameter of 10 to 100 nm.

In an example, the primer layer may be fabricated to provide an average surface roughness of 0.3 µm to 20 µm, preferably 0.3 µm to 5 µm, and more preferably 0.3 µm to 1 µm, which may be determined by a particle diameter of the conductive material. Most magnesium-based cathode active materials have a particle size of dozens of nm to hundreds of nm. Thus, if a suitable surface roughness of the primer layer is not secured, it may be difficult to provide a desired adhesive strength. High surface roughness may be obtained, preferably by cluster-type coating that will be described later.

A primer layer formed of a conductive polymer alone may also be used. In this case, however, the surface roughness as described above cannot be obtained, thereby failing to obtain a desired level of adhesive strength.

Examples of the polymer material include at least one selected from the group consisting of polyimide copolymers, acrylate copolymers, polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene-butadiene rubbers, and fluororubbers, but are not limited thereto. More preferably, polyimide copolymers are used.

The primer layer may have a thickness of 100 nm to 1 µm and may be a film-type layer with a uniform thickness or a cluster-type layer without having a uniform thickness. Particularly, since the cluster-type primer layer has high specific surface area, it provides better adhesive strength than the film-type primer layer when the cathode active material is attached thereto, so that the cluster-type layer is more suitable. If the cluster-type primer layer is formed, stainless steel is preferably used as the metallic base.

The primer may be coated on one or both surfaces of the current collector, preferably on both surfaces thereof.

The primer may be applied to the surface of the current collector using, for example, a method including preparing a coating solution by adding the conductive material and the polymer material to a predetermined volatile solvent, coating the solution on the current collector, and removing the solvent. Examples of the volatile solvent include, NMP, water, methyl isobutyl ketone (MIBK), and isopropanol, but are not limited thereto.

The present invention also provides a magnesium secondary battery using the cathode current collector as described above as a component of the cathode.

Methods of manufacturing a magnesium secondary battery including a cathode, an anode, a separator, and a magnesium salt-containing non-aqueous electrolyte using the cathode current collector according to the present invention are well known in the art.

For example, the cathode may be prepared by coating a mixture of a cathode active material, a conductive agent, and a binder on the cathode current collector and drying the coating. If required, the mixture may further include a filler.

The cathode active material may be an Mo-based compound or alloy, for example, $Mo_6S_8$.

The conductive agent is generally added in an amount of 1 to 30% by weight, based on the total weight of the mixture including the cathode active material. Any conductive agent may be used without particular limitation so long as it has suitable conductivity without causing adverse chemical changes in the fabricated battery. Examples of suitable conductive agents include graphite such natural graphite and artificial graphite; carbon black such as acetylene black, Ketjen black, channel black, furnace black, lamp black and thermal black; conductive fiber such as carbon fiber and metallic fiber; metallic powder such as carbon fluoride powder, aluminum powder, and nickel powder; conductive whisker such as zinc oxide and potassium titanate; conductive metal oxides such as titanium oxide; and conductive materials such as polyphenylene derivatives.

The binder is a component which enhances binding of an active material to a conductive agent and a current collector. The binder is generally added in an amount of 1 to 30% by weight based on the total weight of the mixture including the cathode active material. Examples of the binder include polyvinylidene fluoride, polyvinyl alcohol, and carboxymethyl cellulose (CMC).

The anode may be magnesium metal with a thickness of 3 µm to 500 µm and may be formed in various forms including films, sheets, foils, nets, porous structures, foams, and non-woven fabrics.

The separator is interposed between the cathode and the anode. As the separator, an insulating thin film having high ion permeability and mechanical strength is used. The separator typically has a pore diameter of 0.01 to 10 µm and a thickness of 5 to 300 µm. As the separator, sheets or non-woven fabrics made of an olefin polymer such as polypropylene, glass fiber such as glass filter, or polyethylene, which have chemical resistance and hydrophobicity, are used. When a solid electrolyte such as a polymer is employed as the electrolyte, the solid electrolyte may also serve as both the separator and electrolyte.

The magnesium salt-containing non-aqueous electrolyte includes magnesium and a non-aqueous electrolytic solution, preferably includes a magnesium organometallic compound, for example, $Mg(AlCl_2BuEt)_2/THF$.

A magnesium secondary battery according to the present invention may be applied not only to battery cells used as power sources for small devices, but also to medium and large battery packs including a plurality of battery cells used as power sources for medium and large devices.

Examples of the medium and large device include electric cars such as electric vehicles (EVs), hybrid electric vehicles (HEV), and plug-in hybrid electric vehicles (PHEV); electric motorcycles such as electric bikes (E-bikes) and electric scooters (E-scooters); power tools; power storage devices; and the like, but are not limited thereto.

The components of the magnesium secondary battery including the cathode current collector have been described above. If required, some of the components can be removed or replaced, or another component can be added thereto.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, the present invention will be described in more detail with reference to the following examples. These examples are provided only to illustrate the present invention and should not be construed as limiting the scope and spirit of the present invention.

EXAMPLE 1

50% by weight of carbon black, as a conductive material, having a particle diameter distribution of 20 nm to 80 nm and 50% by weight of polyimide were added to NMP to prepare a coating solution, followed by coating the coating solution on a stainless steel foil to have a thickness of 1 μm and an average surface roughness of 0.3 μm and drying the coating to prepare a cathode current collector. A cathode slurry prepared by adding 80% by weight of $Mo_6S_8$, 10% by weight of PVDF, and 10% by weight of Denka Black to NMP was coated on the cathode current collector to a thickness of 70 μm, and the resultant was dried and rolled to prepare a cathode for a magnesium secondary battery.

Figure 1:
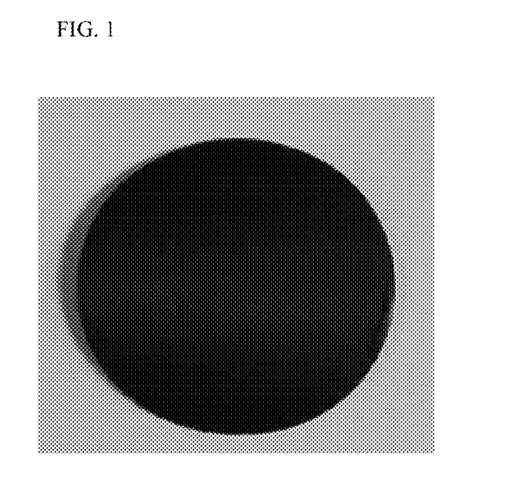
FIGS. 1 and 2 are photographs of cathodes of coin-type magnesium secondary batteries prepared in Example 1 and Comparative Example 1 after rolling.

Referring to FIG. 1, it can be seen that the surface is clean even after drying and rolling when the active material is coated on the primer-coated stainless steel foil. This is because adhesive strength between the stainless steel foil current collector and the active material is improved as described above.

Comparative Example 1

A cathode for a magnesium secondary battery was prepared in the same manner as in Example 1, except that a stainless foil with an average surface roughness of 0.1 μm or less was used alone as a cathode current collector.

Figure 2:
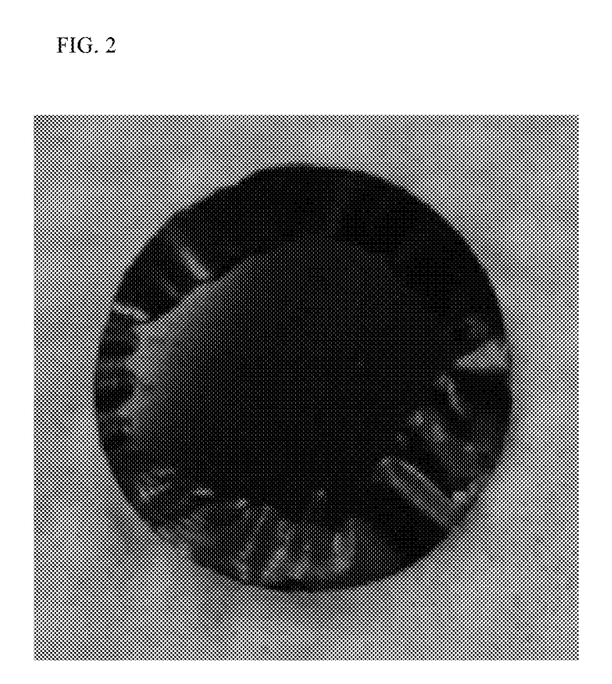

Referring to FIG. 2, it can be seen that the active material is separated from the current collector at edges after drying and rolling when the active material is coated on the stainless steel foil. This is because adhesive strength between the current collector and the active material is reduced due to high surface smoothness, mechanical strength, ductility, and malleability of the stainless steel foil.

Comparative Example 2

A cathode for a magnesium secondary battery was prepared in the same manner as in Example 1, except that a conductive polymer-coated stainless steel providing an average surface roughness of 0.2 μm was used as a cathode current collector.

Test Example 1

Coin-type magnesium secondary batteries were fabricated by interposing a glass filter, as a separator, between one of the cathodes for magnesium secondary batteries prepared respectively in Example 1 and Comparative Example 1 and a magnesium foil, as an anode, and injecting 0.25 M $Mg(AlCl_2BuEt)_2$ in THF thereinto as an electrolytic solution.

With respect to the fabricated coin-type magnesium secondary batteries, various tests were performed. The results are shown in FIGS. 3 to 6 and will be described below.

Figure 3:
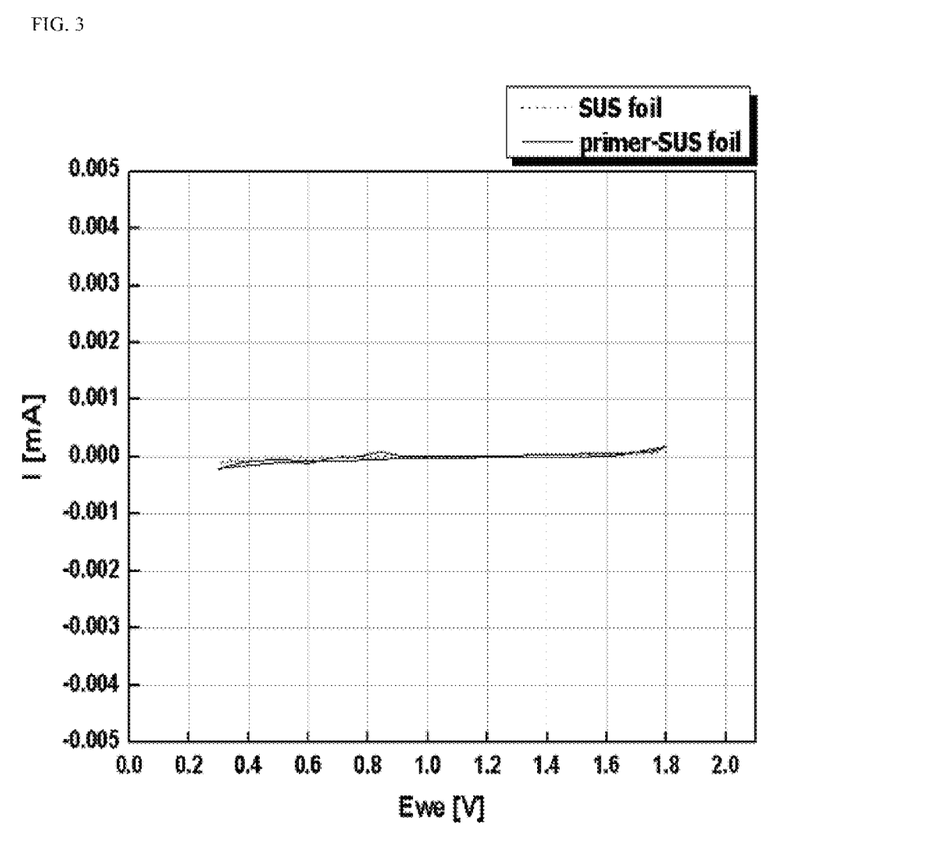
FIG. 3 is a graph illustrating cyclic voltammetry results of magnesium secondary batteries including cathodes prepared in Example 1 and Comparative Example 1 and fabricated in Test Example 1.

First, referring to FIG. 3, it can be seen that the magnesium secondary batteries according to Example 1 and Comparative Example 1 were stable in a typical operating voltage range, i.e., in the range of 0.3 to 1.9 V, of magnesium. This is because, electrochemical reactions do not occur between materials used as the current collector in Example 1 and Comparative Example 1 and $Mg(AlCl_2BuEt)_2$/THF of the electrolyte.

Figure 4:
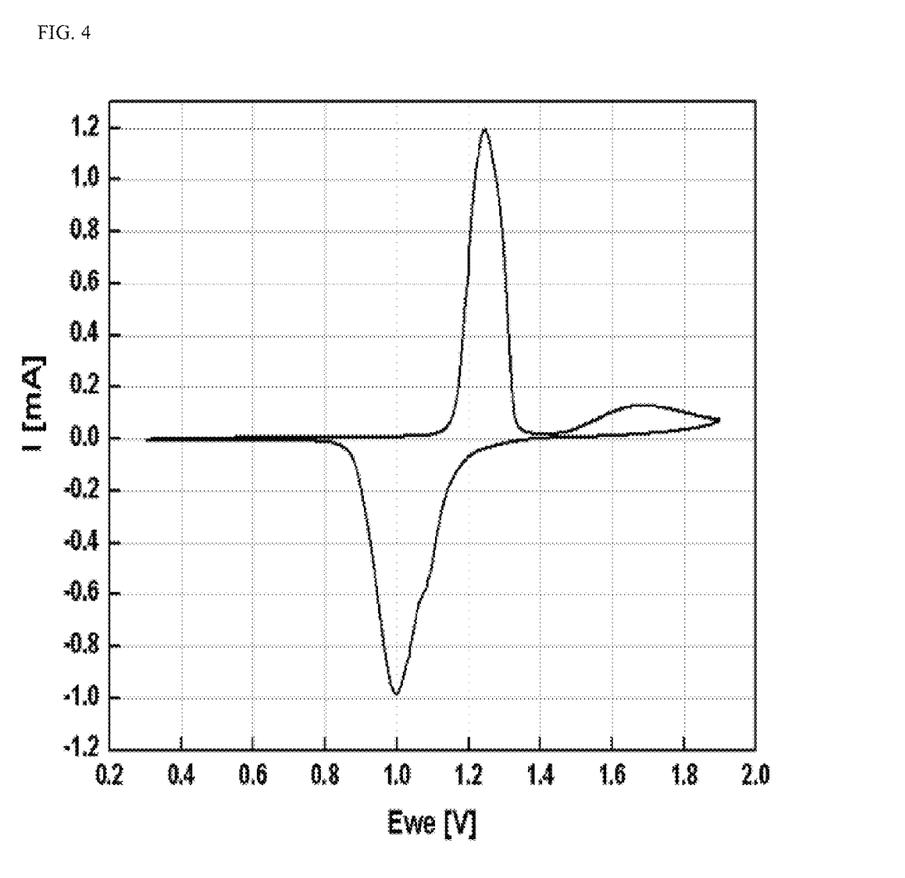
FIG. 4 is a graph illustrating cyclic voltammetry results of a magnesium secondary battery including a cathode prepared in Example 1 and fabricated in Test Example 1.
Figure 5:
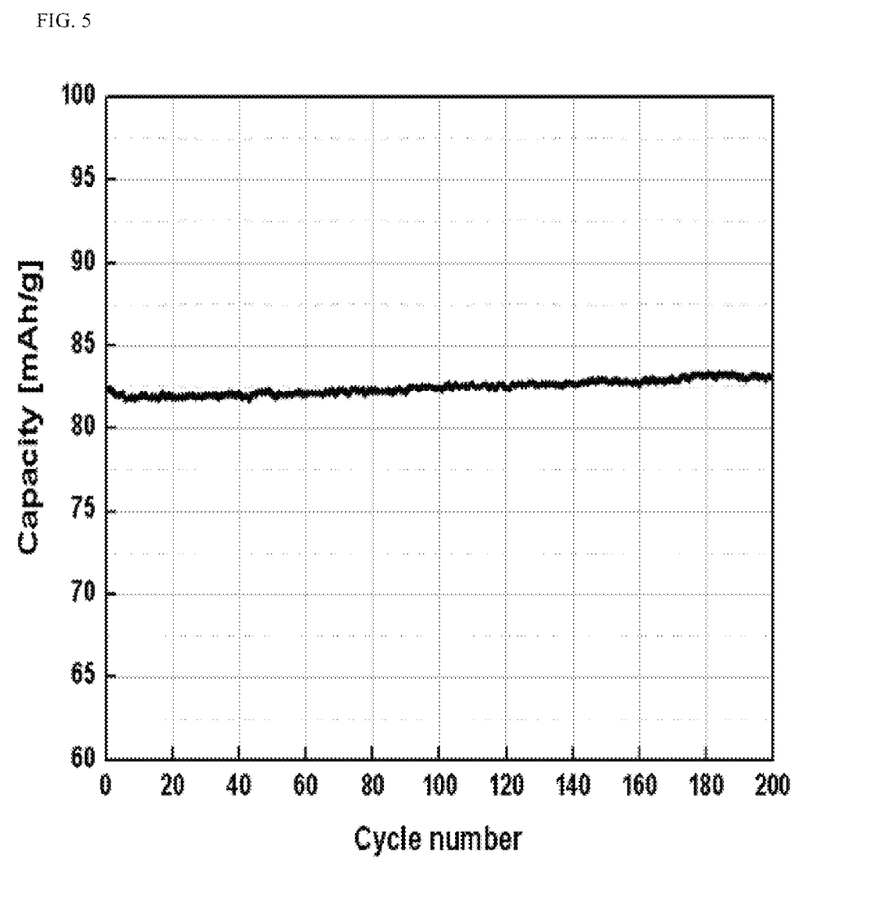
FIG. 5 is a graph illustrating capacity change of a magnesium secondary battery including a cathode prepared in Example 1 and fabricated in Test Example 1 with respect to the number of charge/discharge cycles at 1 C charge and 1 C discharge.

In addition, referring to FIG. 4, intercalation and deintercalation peaks of magnesium were observed in a voltage range of 0.3 to 1.8 V in the magnesium secondary battery according to Example 1. Referring to FIG. 5, stable charging and discharging behavior were observed at about 200 cycles, and there was no capacity reduction.

Figure 6:
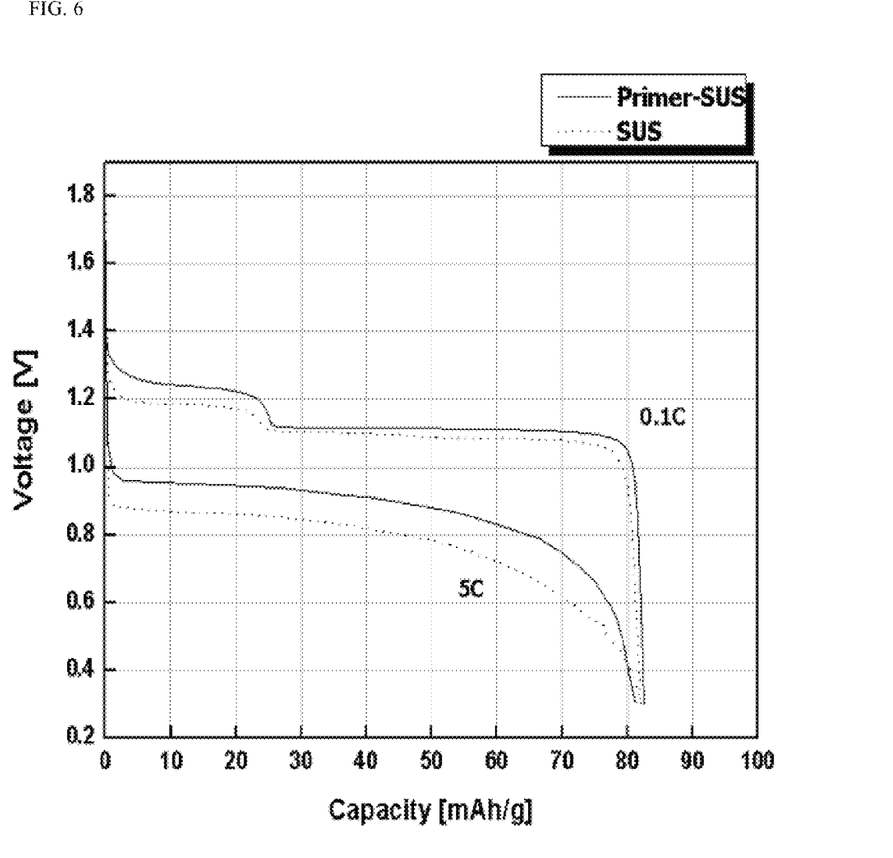
FIG. 6 is a graph illustrating discharge test results of magnesium secondary batteries respectively including cathodes prepared in Example 1 and Comparative Example 1 and fabricated in Test Example 1 at 0.1 C and 5 C.

Meanwhile, referring to FIG. 6, the magnesium secondary battery according to Example 1 showed less capacity reduction rates than the magnesium secondary battery according to Comparative Example 1 under both 0.1 C and 5 C conditions. Particularly, it was identified that the magnesium secondary battery according to Example 1 showed far better characteristics than the magnesium secondary battery according to Comparative Example 1 during discharging at the high-rate of 5 C.

Test Example 2

Peel strength of the cathodes for magnesium secondary batteries respectively prepared in Example 1 and Comparative Examples 1 and 2 was measured. Particularly, the surface of the fabricated cathodes was cut and fixed to a slide glass, and then peel strength was measured while a strip of the current collector was peeled at 180°. The results are shown in Table 1 below. An average obtained from three measured peel strengths was used for evaluation.

TABLE 1

|  | Adhesive strength (g) |
| --- | --- |
| Example 1 | 20 |
| Comparative Example 1 | 2 |
| Comparative Example 2 | 10 |

As shown in Table 1, adhesive strength according to Example 1 was far greater than that according to Comparative Examples 1 and 2.

Test Example 3

Coin-type magnesium secondary batteries were fabricated by interposing a glass filter, as a separator, between one of the cathodes for magnesium secondary batteries prepared respectively in Example 1 and Comparative Examples 1 and 2 and a magnesium foil, as an anode, and injecting 0.25 M Mg(AlCl$_2$BuEt)$_2$ in THF thereinto as an electrolytic solution.

High-rate discharge characteristics of the fabricated magnesium secondary batteries were measured, and the results are shown in Table 2 below.

TABLE 2

| | High-rate discharge characteristics (discharge capacity percentage at 10 C compared to discharge capacity at 0.3 C) |
|---|---|
| Example 1 | 93% |
| Comparative Example 1 | 75% |
| Comparative Example 2 | 86% |

As shown in Table 2, the battery fabricated according to Example 1 has far greater high-rate discharge characteristics than the batteries prepared according to Comparative Examples 1 and 2.

INDUSTRIAL APPLICABILITY

As apparent from the afore-going, the cathode current collector according to the present invention includes stainless steel coated with the primer including a conductive material and a polymer material. Thus, increase in peeling resistance of the cathode active material occurring in conventional cathode current collectors including stainless steel not coated with the primer may be inhibited. Therefore, excellent electrical characteristics can be maintained in the magnesium batteries.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A magnesium secondary battery comprising:
   a cathode comprising a cathode active material capable of intercalating and deintercalating magnesium ions;
   an anode comprising an anode active material capable of intercalating and deintercalating magnesium ions;
   a separator interposed between the cathode and the anode; and
   an electrolytic solution comprising magnesium ions,
   wherein the cathode comprises a current collector formed by coating a primer comprising a conductive material and a polymer material on a metallic base and the cathode active material coated on the current collector,
   wherein the mixing ratio of the conductive material and the polymer material in the primer is in the range of 1:10 to 10:1 on a weight ratio basis,
   wherein the metallic base is made of stainless steel, and
   wherein the primer has an average surface roughness of 0.3 µm to 20 µm.

2. The magnesium secondary battery according to claim 1, wherein the metallic base has a thickness of 3 µm to 150 µm, and the primer coating has a thickness of 100 nm to 1 µm.

3. The magnesium secondary battery according to claim 1, wherein the conductive material comprises at least one material selected from the group consisting of graphite, carbon black, acetylene black, Ketjen black, channel black, furnace black, lamp black, thermal black, carbon fiber, and carbon fluoride.

4. The magnesium secondary battery according to claim 1, wherein the polymer material comprises at least one material selected from the group consisting of polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene-butadiene rubbers, and fluororubbers.

5. The magnesium secondary battery according to claim 1, wherein the primer has an average surface roughness of 0.3 µm to 5 µm.

6. The magnesium secondary battery according to claim 1, wherein the cathode active material comprises an Mo-based compound or alloy.

7. The magnesium secondary battery according to claim 6, wherein the cathode active material comprises Mo$_6$S$_8$.

8. The magnesium secondary battery according to claim 1, wherein the anode active material comprises magnesium or a magnesium compound.

9. The magnesium secondary battery according to claim 1, wherein the electrolytic solution comprises a magnesium organometallic compound.

10. A battery pack comprising a magnesium secondary battery according to claim 1 as a unit battery.

11. The battery pack according to claim 10, the battery pack is a battery pack for a power source of electric vehicles, hybrid electric vehicles, power tools, or power storage devices.

12. The magnesium secondary batter according to claim 1, wherein the metallic base made of stainless steel is in a mesh form.

* * * * *